United States Patent
Brownfield et al.

(10) Patent No.: US 6,527,164 B1
(45) Date of Patent: Mar. 4, 2003

(54) REMOVING FLUX RESIDUE FROM REFLOW FURNACE USING ACTIVE GASEOUS SOLVENT

(75) Inventors: Terri J. Brownfield, Boulder Creek, CA (US); Jonathan D. Halderman, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/584,128

(22) Filed: May 31, 2000

(51) Int. Cl.[7] .......................... B23K 28/00; B23K 1/20; C25F 5/00
(52) U.S. Cl. .................. 228/201; 228/205; 228/206; 228/219; 228/42; 219/388; 219/390; 134/1.1; 134/22.1
(58) Field of Search .................. 228/42, 206, 219, 228/180.21, 201–205; 134/1.1, 22.1; 216/60, 67; 219/388, 390

(56) References Cited

U.S. PATENT DOCUMENTS

| | | | |
|---|---|---|---|
| 3,752,642 A | * 8/1973 | Early et al. .................. 432/66 |
| 4,580,716 A | * 4/1986 | Barresi et al. ............... 228/219 |
| 4,960,488 A | * 10/1990 | Law et al. ..................... 134/1 |
| 5,068,007 A | * 11/1991 | Rogers et al. ........... 204/192.35 |
| 5,195,674 A | * 3/1993 | Nishi ........................... 219/388 |
| 5,207,836 A | * 5/1993 | Chang ............................ 134/1 |
| 5,261,593 A | * 11/1993 | Casson et al. ........... 228/180.22 |
| 5,308,402 A | * 5/1994 | Bixenman et al. .............. 134/2 |
| 5,344,592 A | * 9/1994 | Wilczek et al. ................. 134/2 |
| 5,345,056 A | * 9/1994 | Frei et al. ............... 219/121.43 |
| 5,354,698 A | * 10/1994 | Cathey, Jr. ................... 438/475 |
| 5,364,007 A | * 11/1994 | Jacobs et al. .................. 228/42 |
| 5,579,981 A | * 12/1996 | Matsumura et al. ......... 219/201 |
| 5,609,290 A | * 3/1997 | Bobbio et al. ............... 228/206 |
| 5,611,476 A | * 3/1997 | Soderlund et al. ............. 228/42 |
| 5,615,825 A | * 4/1997 | Bobbio et al. ............... 228/206 |
| 5,993,500 A | * 10/1997 | Bailey et al. ............... 55/385.6 |
| 5,759,285 A | * 6/1998 | Buchwalter et al. ............ 34/77 |
| 5,785,796 A | * 7/1998 | Lee ............................. 156/345 |
| 6,146,448 A | * 11/1998 | Shaw et al. .................... 95/287 |
| 5,861,065 A | * 1/1999 | Johnson ......................... 134/2 |
| 5,879,574 A | * 3/1999 | Sivaramakrisnan et al. ... 216/60 |
| 5,913,589 A | * 6/1999 | Dow et al. ..................... 34/378 |
| 6,120,585 A | * 9/2000 | Inomata et al. ............. 55/315.1 |
| 6,193,774 B1 | * 2/2001 | Durdag et al. .................. 34/77 |
| 6,382,500 B1 | * 5/2002 | Master et al. ............. 228/180.1 |

FOREIGN PATENT DOCUMENTS

JP  58-212861 A  * 12/1983

* cited by examiner

Primary Examiner—Tom Dunn
Assistant Examiner—L. Edmondson

(57) ABSTRACT

A method of cleaning residue on surfaces in a reflow furnace includes introducing a solvent into the furnace chamber; reacting the solvent with the residue to form a product; and, removing the product from the furnace chamber. The solvent is gaseous, such as an etch gas. Also, the product of the reaction between the residue and the solvent can is gaseous. The gaseous product can then be exhausted from the reflow furnace. A reflow furnace for practicing the method is also disclosed.

6 Claims, 3 Drawing Sheets

REMOVING FLUX RESIDUE FROM REFLOW FURNACE USING ACTIVE GASEOUS SOLVENT

FIELD OF THE INVENTION

The present invention relates to the manufacturing of semiconductor devices, and more particularly, to reflow welding processes that generate flux residue.

BACKGROUND OF THE INVENTION

Reflow furnaces are used for the reflowing of solder, also known as reflow welding, during the assembly of semiconductor devices by the surface mounting of electrical components to a circuit board or other substrate. With reference to FIG. 1, a typical reflow furnace 10 according to the prior art is illustrated. The furnace 10 includes a conveyor belt 12 for passing the electronic components into a number of different zones 14, 16, 18, 20, which are generally divided into a preheat zone 14, a soak zone 16, a reflow zone 18, and a cooling zone 20.

Before the circuit board enters the furnace 10, depending upon the type of component being reflow welded, either solder paste or flux paste/liquid is applied to the areas to be soldered. Solder paste comprises solder as well as flux and other additives, such as a solvent, whereas flux paste does not include solder. Flux paste can be used with, for example, flip chips because the flip chip die already includes solder bumps.

Solder is used to form a metallurgically sound solder joint, which will both hold the various electronic components in place and conduct electrical signals. Flux has a variety of purposes, which include removing oxides from metallization on the circuit board; removing oxides on the molten solder to reduce the surface tension and enhance flow; inhibiting subsequent oxidation of the clean metal surfaces during soldering; and assisting in the transfer of heat to the joint during soldering.

Upon entering the preheat zone 14, the initial heating of the circuit board begins. The process window for the preheat zone 14 is a 1° to 3° C./second rise in temperature to between 100° C. to 125° C. During this time, the solvent in the solder paste begins to evaporate. In the thermal soak zone 16, the circuit board is raised to 150° C. to 175° C. in about 60 to 120 seconds. This exposure allows the solder paste to dry and the flux to activate. In the reflow zone 18, the solder is heated to above its melting temperature thereby reflowing to form solder joints. The time during which a solder joint is molten is approximately 60 to 120 seconds, and the peak temperature of the leads in the solder joints is typically 220° C. ±5° C. Upon reaching the cooling zone 18, the circuit board is cooled at a rate not more than 4° C./second, during which time the solder joints solidify. These profile times and temperatures can vary depending upon the type of semiconductor device, circuit board size, board density, throughput requirements, type of reflow equipment, and solder paste.

Many problems associated with this process are generated by use of the flux. Depending upon the type of flux paste used, a flux residue can remain after reflow welding. The residue can comprise a carrier, such as rosin or resin that is not evaporated, acid or salt deposits, and the removed oxides. If not removed, this residue can be detrimental to the long-term reliability of an electronic package. The resin can also absorb water and become an ionic conductor, which could result in electrical shorting and corrosion. Additionally, the residual activator can, over a period of time, corrode the soldered components and cause electrical opens.

When a flux is used that leaves corrosive and/or hygroscopic residues, post-soldering cleaning using chlorinated fluorocarbons (CFCs), organic solvents, semi-aqueous solutions, or water is required. For this type of process, in addition to volatile organic compound emissions from the soldering process, the cleaning process results in emission of CFCs and waste water. These emissions detrimentally add to environmental pollution and production costs.

To solve the problem of cleaning after reflow welding, no-clean fluxes have been introduced into the reflow soldering industry. Instead of the residue remaining on the circuit board after reflow welding, these no-clean fluxes are designed to undergo chemical decomposition at a given temperature, also known as pyrolyzation, during which the residue becomes a vapor and is emitted into the furnace atmosphere. Because this flux leaves little or no residue, the need to clean the circuit board after reflow welding is negated.

A problem associated with the use of no-clean fluxes, however, is that the residue vapor emitted into the furnace atmosphere via pyrolyzation tends to condense very quickly onto cool surfaces within the reflow furnace. This problem, although very prevalent with no-clean fluxes, also exists with fluxes that require cleaning after reflow. The condensed residue can cause many problems within the reflow furnace. For example, the condensed residue is often a liquid that can build up within the furnace and drip back onto the circuit board.

Another problem associated with the residue vapor is that the residue tends to build up on surfaces within the furnace such as fan blades, air amplifiers, feed lines, motor shafts, or heat exchangers. With heat exchangers, the residue will impair the efficiency of the heat exchanger and eventually require the heat exchanger to be cleaned. The cleaning of the heat exchanger and other components in the reflow furnace requires that the operation of the reflow furnace be halted. Also, in many cases the heat exchanger and other components must be removed from the reflow furnace and placed in a solvent bath. It can be recognized that for safety purposes, the furnace must be in a cooled state before the components of the furnace can be cleaned. The downtime of the reflow furnace associated with this periodic cleaning adds to the cost of production.

Many different type of systems have been employed to minimize problems associated with the condensation of residue within the reflow furnace. In some systems, the furnace atmosphere is exhausted to remove the residue vapor. In other systems, the furnace atmosphere is recycled through filters that remove the residue vapor. However, with each of these systems, the residue vapor can still condense upon surfaces within the reflow furnace, and therefore will still require cleaning of the furnace. Accordingly, a need exists for an improved method of operating a reflow furnace that reduces or eliminates the requirement to clean condensed residue within the reflow furnace.

SUMMARY OF THE INVENTION

This and other needs are met by embodiments of the present invention which provide a method of cleaning residue on surfaces in a reflow furnace. The method comprises introducing a solvent into the furnace chamber; reacting the solvent with the residue to form a product; and, removing the product from the furnace chamber.

By reacting the residue to form a product and then removing the product from the furnace chamber, the present invention removes residue formed on surfaces within the reflow furnace, thereby avoiding the need to shut down the furnace and clean the surfaces within the furnace. Also, having clean surfaces within the reflow furnace allows for greater efficiency of heat exchangers within the furnace and leads to less contamination of semiconductor devices being reflowed within the reflow furnace.

A further aspect of the present invention is the introduction of a gaseous solvent into the furnace chamber. The solvent can be an etch gas, such as oxygen, carbon monoxide, nitrous oxide, and water vapor. A gaseous solvent is better able to access all potentially contaminated surfaces within the reflow oven. Furthermore, the product of the solvent can also be gaseous. This advantageously allows the product to be exhausted from the reflow furnace.

Another aspect of the present invention is that the solvent used during certain embodiments of this process reacts with the residue at a temperature within the operating range of the reflow furnace. Advantageously, this allows the etch gas to be introduced into the process during the operation of the reflow furnace without having to make any changes in temperature to the reflow furnace. The operating temperature of the furnace during reflow is from about 220° C. to about 280° C. in certain embodiments.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout, and wherein.

DETAILED DESCRIPTION OF THE INVENTION

The present invention addresses and solves the problem of residue deposited within reflow furnaces as a result of the volatilization of flux and other materials during reflow welding. This is achieved in part, by introducing a solvent into the reflow furnace to react with the residue within the reflow furnace. Advantageously, when the product of the reaction between the residue and the solvent is gaseous, the product can be removed from the reflow furnace without halting the operation of the reflow furnace for cleaning.

Figure 1:
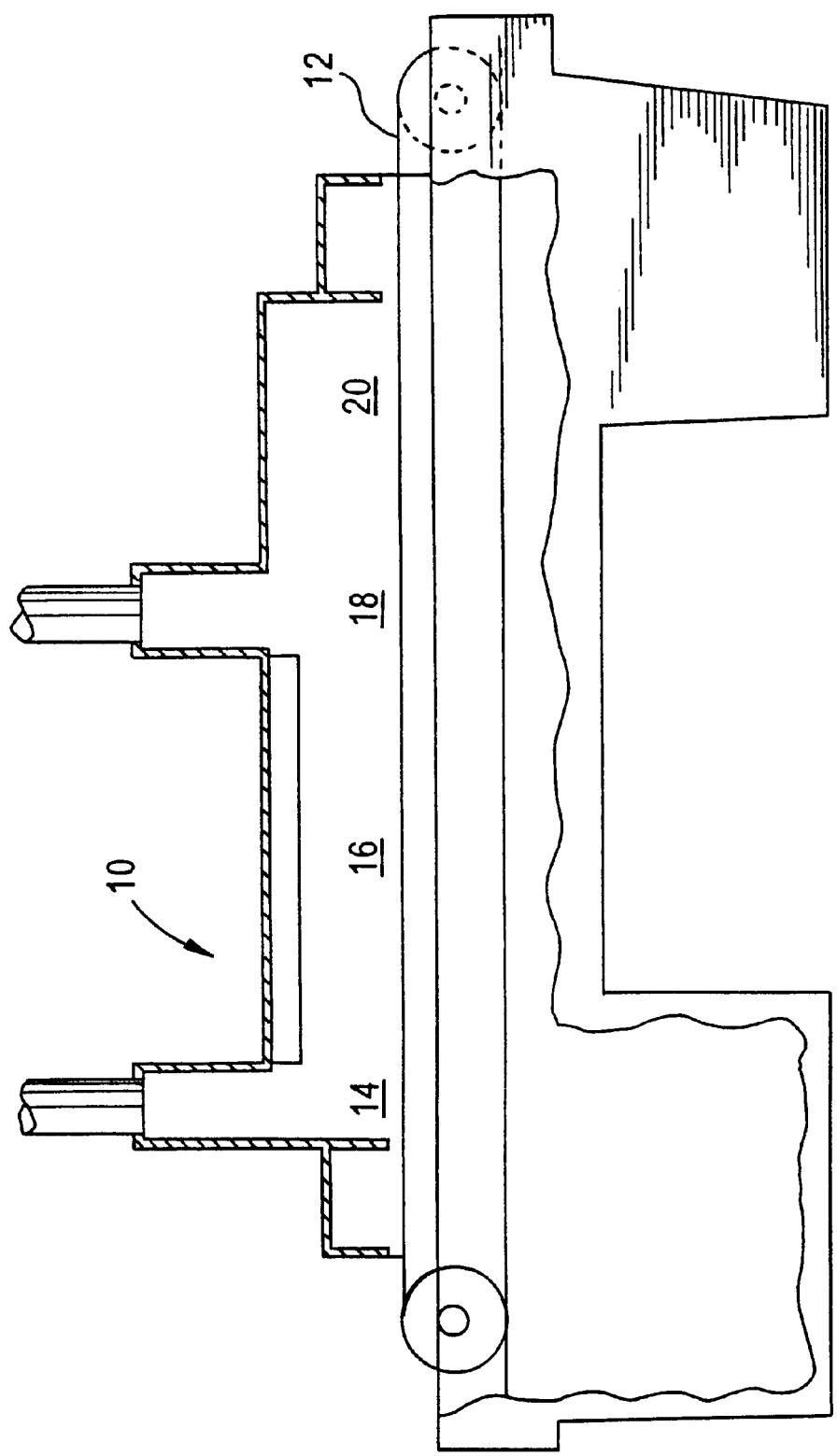
FIG. 1 is a reflow furnace in accordance with the prior art.
Figure 2:
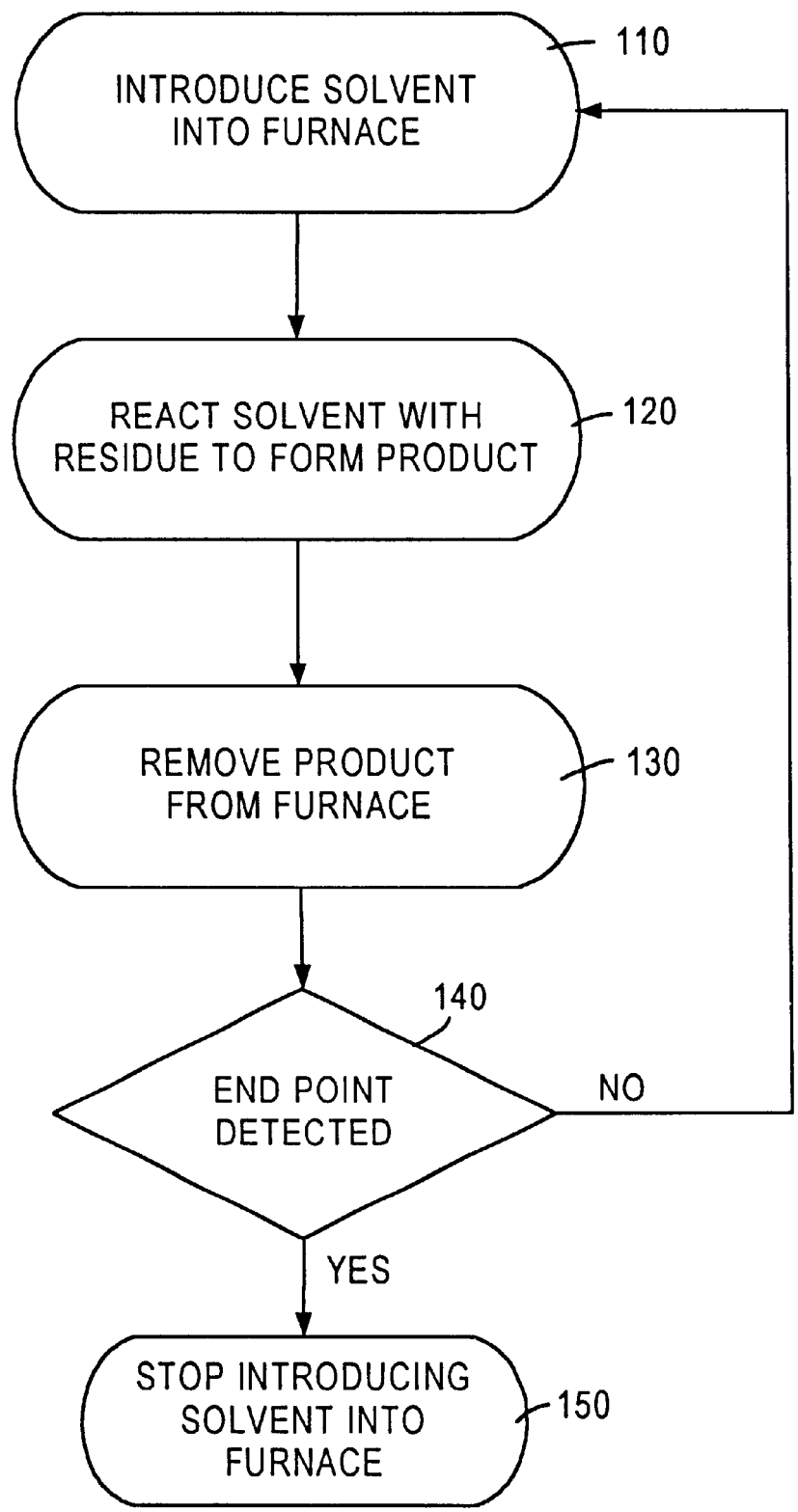
FIG. 2 is a flow chart of a method according to an embodiment of the present invention.

Referring now to the flow chart of FIG. 2, a method of removing residue on surfaces within a reflow furnace is disclosed. At step 110, solvent is introduced into the reflow furnace. Although the solvent can be introduced into any location within the reflow furnace, the solvent is preferably introduced into areas in the furnace chamber where the residue accumulates. Because the residue is also generated within the furnace chamber, introducing the solvent into the furnace chamber advantageously allows the solvent to reach the surfaces contaminated with residue.

Any solvent or combination of solvents capable of reacting with the residue is acceptable for use with this invention. However, the preferred solvent is gaseous. Because the residue was originally a vapor before condensing on surfaces within the reflow furnace, these surfaces can be difficult to access. However, a gaseous solvent can advantageously also reach these same difficult-to-access surfaces in the same manner as the residue. In a preferred embodiment of the invention, the solvent is an etch gas. Examples of etch gases acceptable for use with this invention include oxygen, carbon monoxide, nitrous oxide, and water vapor.

At step 120, the solvent and the residue react to form a product. The type of residue, for example residue from the volatilization of flux, determines the type of solvent to be introduced, and the type of solvent thereby determines the resulting product. In a preferred embodiment, the product formed from the reaction of the solvent with the residue is gaseous, such as carbon dioxide. A gaseous product can generally be more easily removed from the reflow furnace than a non-gaseous product as discussed below in more detail.

In a most preferred embodiment of the invention, the etch gas is reactive with the product at a temperature that is within the operating temperature range of the reflow furnace. In certain embodiments of the invention, the operating temperature range of the furnace is maintained from about 220° C. to about 280° C., most preferably below 270° C. It should be noted however, that these temperature ranges can vary. As is known in art, for example, the low end of the temperature range can vary depending upon the melting temperature of the solder used and the pyrolyzation temperature of the flux used, and the high end of the temperature range can vary depending upon how susceptible a given component or substrate is to damage by heat.

The resulting product from the reaction of the solvent with the residue is removed at step 130. The removing step can be performed concurrently when the furnace is operation, or alternatively, the removing step can be performed when no electronics components are being reflow welded. Although any method capable of removing the product from the reflow furnace is acceptable for use with this invention, the preferred method is capable of being performed concurrently with the operation of the furnace. Also, the method of removal will be determined by the properties of the product. For example, if the product is gaseous, a preferred method of removing the product is to exhaust the interior atmosphere of the reflow furnace. By exhausting the product from the reflow furnace, the operation of the reflow furnace advantageously does not require halting. Thus, the reflow furnace can continue to operate during the exhausting of the product.

Figure 3:
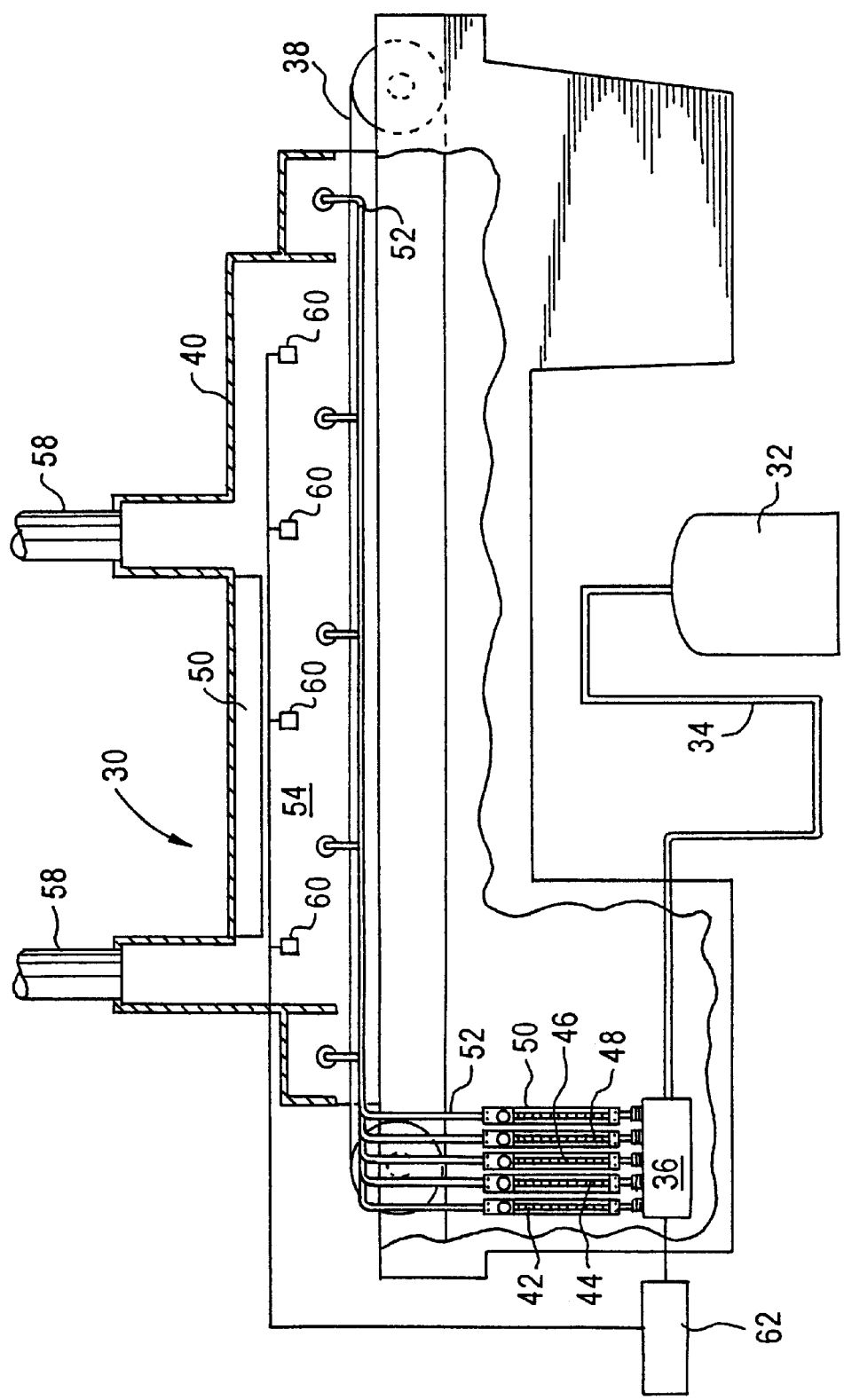
FIG. 3 is a reflow furnace according to an embodiment of the present invention.

With reference to FIG. 3, a reflow solder furnace 30 according to an embodiment of the invention is illustrated. The furnace 30 is supplied with a gaseous solvent, for example from a vessel 32 via a main line 34. This gaseous solvent is then introduced into a manifold block 36, which provides for discrete supply of the gaseous solvent through various conduits from the main line 34. Although five separate lines are shown emanating from the manifold block 36, it is understood that more or less distribution could be performed. The gaseous solvent then flows through flow control meters 42, 44, 46, 48 and 50, respectively, for each of the distribution lines 52 emanating from the flow control meters. Each of these distribution lines 52 penetrates the housing 40 of furnace 30 and enters the heating chamber 54.

The furnace 30 includes a conveyor belt 38 for supporting electronic components to be soldered. Within the chamber 54, the distribution lines 52 provide the gaseous solvent, which reacts with residue within the furnace 30. Sources of heat, such as infrared radiant lamps 56, provide the necessary conditions for reflow welding, and also to activate the solvent. The furnace 30 can also include an exhaust 58 for removing the product of the reaction between the solvent and the residue.

The invention is not limited as to a particular frequency of cleanings. However, in certain embodiments of the invention, the cleanings can be performed at set intervals. For example, a cleaning can be performed when the amount of residue with the reflow furnace reaches a certain amount. Alternatively, the cleaning can be performed after a set amount of electronic packages have been reflowed. In another example, the cleaning can be performed after the reflow furnace has been operated a set amount of time. By cleaning the reflow furnace at a set frequency, excessive buildup of residue within the reflow furnace can be prevented and the problems associated with excessive buildup of residue can also be prevented.

In a current embodiment, the cleaning is performed when electronic packages are not being reflowed within the reflow furnace. However, the invention is not limited in this regard. For example, the cleaning of the reflow furnace can occur when electronic packages are within the reflow furnace. In such a situation, the solvent is preferably active with the residue within the temperature profile of the reflow furnace. Also, the solvent preferably does not adversely react with the electronic packages when the cleaning occurs concurrently with the reflow welding of the electronic packages.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only the preferred embodiment of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A method of manufacturing a semiconductor device by attaching a component to a substrate in a reflow furnace, comprising the steps of:

a) reflowing the component and substrate in the reflow furnace;

b) introducing a gaseous solvent into a furnace chamber of the reflow furnace;

c) reacting the solvent with flux residue formed on surfaces in the reflow furnace to form a gaseous product, the flux residue formed during said reflowing step; and, d) exhausting the gaseous product from the reflow furnace.

2. A method of manufacturing a semiconductor device according to claim 1, wherein the solvent is an etch gas.

3. A method of manufacturing a semiconductor device according to claim 1, wherein said reflowing step is performed at an operating temperature range and the reacting step is performed at a temperature within the operating temperature range.

4. A method of manufacturing a semiconductor device according to claim 3, wherein the operating temperature range is about 220° C. to about 280° C.

5. A method of manufacturing a semiconductor device according to claim 1, wherein said introducing step and said reacting step occur during said reflowing step.

6. A method of manufacturing a semiconductor device according to claim 1, wherein the flux residue is from a no-clean flux.

* * * * *